(12) United States Patent
Richardson et al.

(10) Patent No.: US 8,496,385 B2
(45) Date of Patent: Jul. 30, 2013

(54) CONNECTOR WITH BUILT-IN MODULE

(75) Inventors: Dean Richardson, Wilmette, IL (US);
Bogdan Andrei, Lisle, IL (US);
Hideyuki Nasu, Tokyo (JP)

(73) Assignee: Molex Incorporated, Lisle, IL (US)

( * ) Notice: Subject to any disclaimer, the term of this patent is extended or adjusted under 35 U.S.C. 154(b) by 294 days.

(21) Appl. No.: 13/071,104

(22) Filed: Mar. 24, 2011

(65) Prior Publication Data
US 2011/0235978 A1  Sep. 29, 2011

Related U.S. Application Data

(60) Provisional application No. 61/317,340, filed on Mar. 25, 2010.

(51) Int. Cl.
*G02B 6/00* (2006.01)
*G02B 6/36* (2006.01)
*G02B 6/42* (2006.01)

(52) U.S. Cl.
USPC .............................................. 385/77; 385/92

(58) Field of Classification Search
USPC ........................................... 385/77–92, 147
See application file for complete search history.

(56) References Cited

U.S. PATENT DOCUMENTS

| | | | | |
|---|---|---|---|---|
| 6,350,063 | B1 * | 2/2002 | Gilliland et al. | 385/88 |
| 6,873,529 | B2 * | 3/2005 | Ikuta et al. | 361/719 |
| 6,961,245 | B2 * | 11/2005 | Ikuta et al. | 361/719 |
| 8,202,011 | B2 * | 6/2012 | Moore | 385/88 |
| 2009/0060426 | A1 * | 3/2009 | Lee et al. | 385/92 |

\* cited by examiner

*Primary Examiner* — Akm Enayet Ullah
(74) *Attorney, Agent, or Firm* — Timothy M. Morella

(57) ABSTRACT

A connector incorporating a module, in which an incorporated electrical component may be cooled efficiently and reliably, is provided. A transmission apparatus disposed inside a main body cover of a module-incorporating connector is provided with a ceramic board at which an electrical component and such are mounted. A metal cover touches an upper face of the electrical component. A portion of the metal cover is disposed in an insertion portion of the main body cover. Heat generated by the electrical component is propagated via the metal cover to the insertion portion of a first cover member. When the module-incorporating connector is connected to a socket of a device, the insertion portion is disposed inside an exterior case, in which temperature is controlled by an air conditioner, and cooling is performed reliably and efficiently.

16 Claims, 5 Drawing Sheets

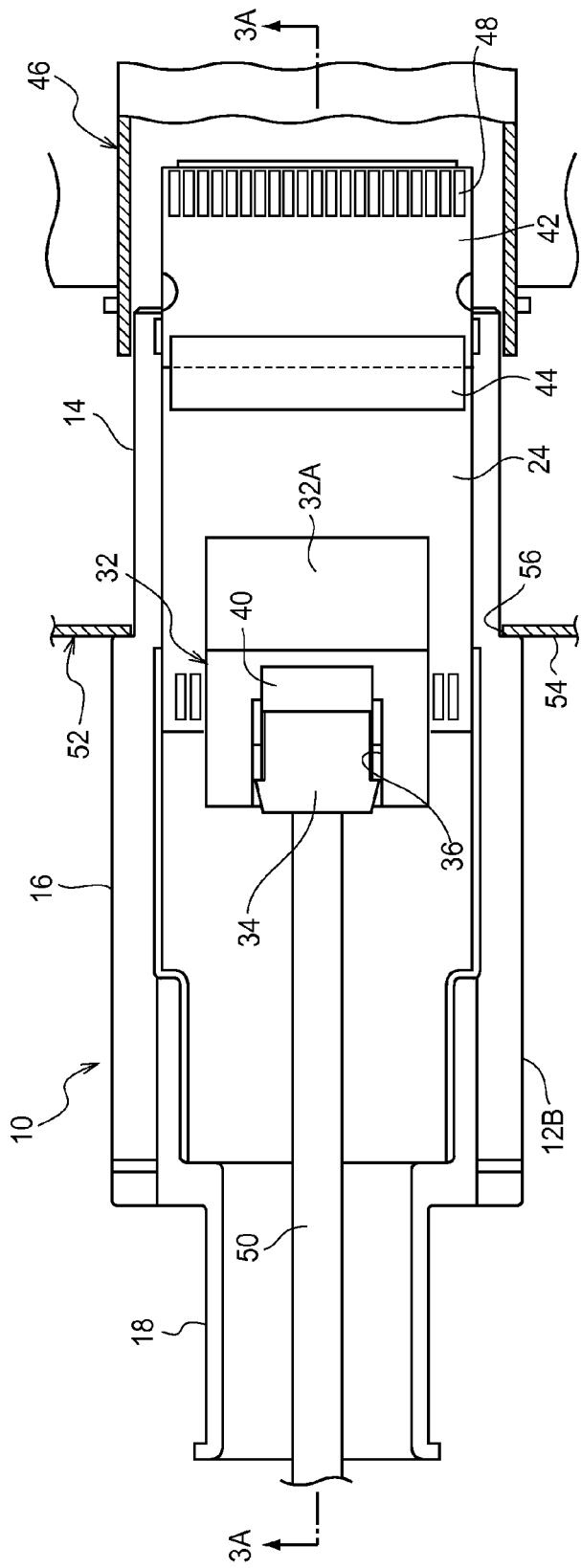

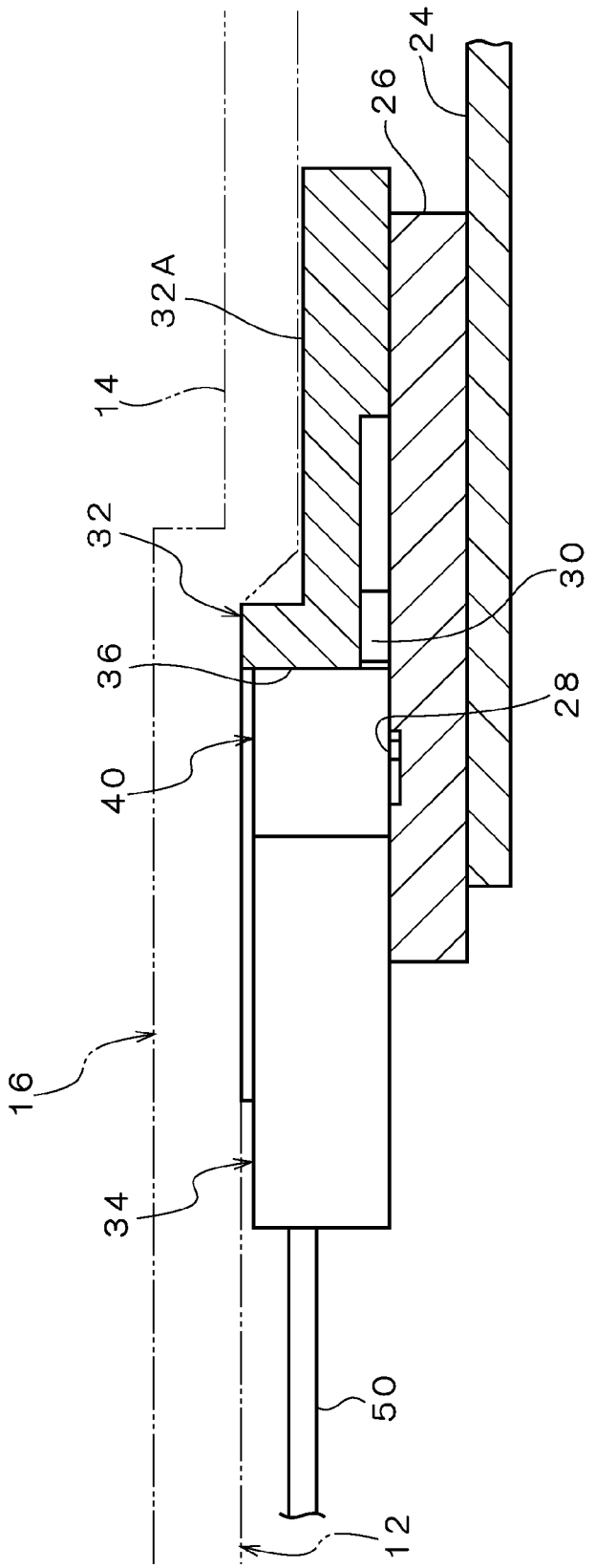

CONNECTOR WITH BUILT-IN MODULE

REFERENCE TO RELATED DISCLOSURES

The Present Disclosure claims priority to prior-filed U.S. Provisional Patent Application No. 61/317,340, entitled "Connector With Built-In Module," filed on 25 Mar. 2010 with the United States Patent And Trademark Office. The contents of the aforementioned patent application are fully incorporated in its entirety herein.

BACKGROUND OF THE PRESENT DISCLOSURE

The Present Disclosure relates generally to a connector and, more particularly, to a connector incorporating a module, which is inserted into a socket of a device and communicates electronic signals between the socket side device, and incorporates an optical module with optical components and electrical components, and is used by being connected to an optical fiber for optical signal communication between devices.

Typically, optical modules are equipped with optical components, such as laser diodes and the like, and electrical components, such as driver integrated circuits and the like, and that convert electrical signals to optical signals. An example of such an optical model is disclosed in Japanese Patent Application No. 2008-040318, the contents of which are fully incorporated in its entirety herein. Further, various kinds of connectors that incorporate this kind of module and that are electrically connected to sockets of devices have been considered.

SUMMARY OF THE PRESENT DISCLOSURE

In accordance with the above-described circumstances, an object of the Present Disclosure is to provide a connector having a module that enables efficient and reliable cooling of an incorporated electrical component.

Accordingly, a connector having a module includes a connector main body case having a first portion that, when the connector main body case is connected to a socket provided at an inner side of an exterior case of a device, penetrates to the inner side of the exterior case; and a second portion, disposed at an outer side of the exterior case. The connector also includes a module, disposed inside the connector main body case, provided with an optical component that implements communication of optical signals, an electrical component connected with the optical component, and a second electrical terminal connected with the electrical component and is connectable with a first electrical terminal provided at the socket. The connector also includes a heat propagation means, of which at least a portion is disposed at the first portion, and which propagates heat generated by the electrical component to the first portion.

The connector may be connected to an optical fiber and to a socket provided at the inner side of an exterior case of a device. An optical component communicates optical signals with the optical fiber. The optical component is preferably a laser component that emits light energy, a photodiode that receives light energy, or a similar device. The electrical component is preferably electrically connected to the optical component and to the second electrical terminal—which is connectable to the first electrical terminal provided at the socket. The electrical component thus connects the connector to the socket. Accordingly, the optical component and the socket are also electrically connected together. Heat generated by the electrical component is propagated to the first portion via the heat propagation means. Because at least a portion of the heat propagation means is disposed at the first portion, the heat propagation means propagates heat to the first portion efficiently. If this connector is connected to a device in which cooling air is circulated through the device interior by an air conditioner and the interior temperature is controlled to stay within a pre-specified temperature range, the cooling air comes into contact with the first portion inside the external case. Accordingly, heat from the electrical component may be efficiently dispersed in the device, and the electrical component may be efficiently and reliably cooled.

The connector may further require the heat propagation means and the connector main body case be formed of metal. Thus, the heat of the electrical component may be propagated and dispersed inside the exterior case efficiently, and cooling efficiency is further improved.

Further, in the connector, the second electrical terminal may be disposed at the first portion, while the electrical component and the optical component may be disposed at the second portion. Additionally, the first portion may be made smaller than the second portion, to be comfortably adapted for small sockets.

Further, in the connector, the heat propagation means may be integrally provided with a connection portion—to which an optical connector provided at an end portion of an optical fiber is connected, and a support portion—which supports an optical part that implements communication between the optical fiber and the optical component. A minimum gap between an inner face of the connector main body case and the optical part is preferably larger than a minimum gap between the inner face and the heat propagation means.

The connection portion, which connects to the optical connector provided at the end portion, and the support portion, which supports the optical part that communicates between the optical fiber and the optical component, are preferably integrally provided at the heat propagation means. This integral aspect greatly reduces the number of components.

Furthermore, because the minimum gap between the inner face and the optical part is preferably larger than that between the inner face and the heat propagation means, interference between the optical part and the connector main body case—in association with assembly of the components, deformation of the connector main body case, etc.—may be prevented, as well as the shifting of the optical part, which can lead to deterioration of optical characteristics.

Thus, as described above, there is an excellent effect in that the incorporated electrical component may be efficiently and reliably cooled. Cooling efficiency is further improved. Additionally, a small socket may be comfortably adapted thereto. Finally, a deterioration of optical characteristics may be prevented.

BRIEF DESCRIPTION OF THE FIGURES

The organization and manner of the structure and operation of the Present Application, together with further objects and advantages thereof, may best be understood by reference to the following Detailed Description, taken in connection with the accompanying Figures, wherein like reference numerals identify like elements, and in which:

FIG. 3B is a horizontal sectional diagram taken along the axial line of the connector of FIG. 1; and FIG. 4 is a vertical sectional diagram of a vicinity of a ceramic board of the connector of FIG. 1.

DESCRIPTION OF THE PREFERRED EMBODIMENTS

While the Present Disclosure may be susceptible to embodiment in different forms, there is shown in the Figures, and will be described herein in detail, specific embodiments, with the understanding that the disclosure is to be considered an exemplification of the principles of the Present Application, and is not intended to limit the Present Disclosure to that as illustrated.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
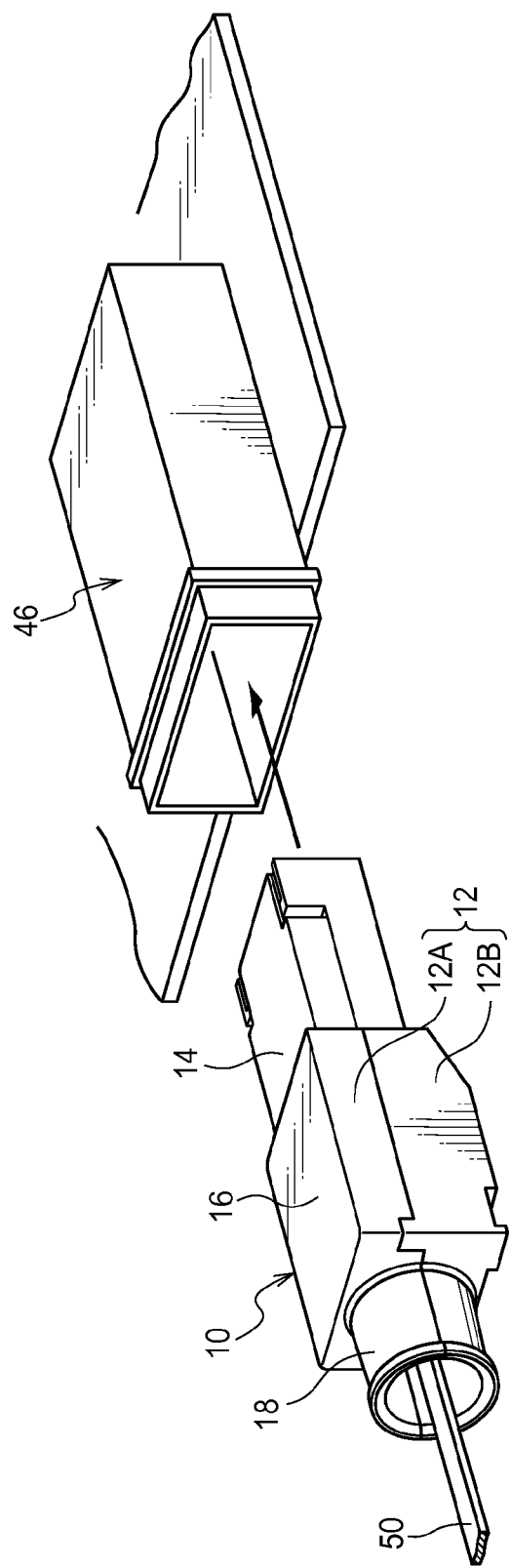
FIG. 1 is a perspective view of a connector and a socket of the Present Disclosure.
Figure 2:
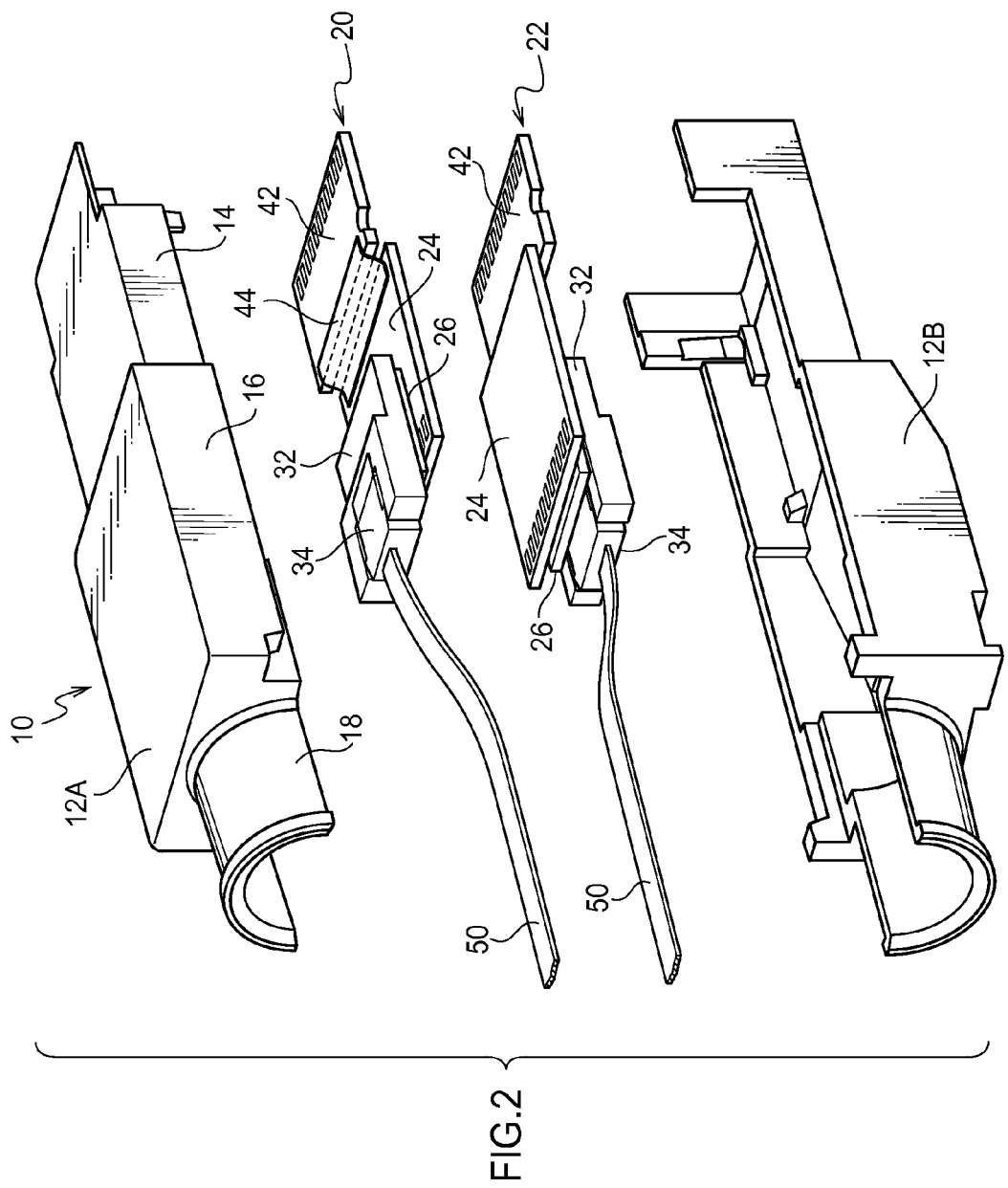
FIG. 2 is an exploded perspective view of the connector of FIG. 1.

As illustrated in FIGS. 1-2, a module-incorporating connector 10 is provided with a long, narrow, hollow main body cover 12. This main body cover 12 is divisible along an axial line into a first cover member 12A and a second cover member 12B. The first cover member 12A and second cover member 12B of the main body cover 12 is preferably formed of a metal (for example, an aluminium alloy, stainless steel, copper or the like; a metal with high thermal conductivity is preferable).

The main body cover 12 is provided with an insertion portion 14 at one end side, a middle portion 16 at the other end side relative to the insertion portion 14, and a fiber pass-through portion 18 at the other end side relative to the middle portion 16. The insertion portion 14 is preferably formed in a rectangular box shape, the middle portion 16 is preferably formed in a box shape larger than the insertion portion 14, and the fiber pass-through portion 18 preferably has a tubular shape. The insertion portion 14, the middle portion 16 and the fiber pass-through portion 18 are preferably joined together at inner portions thereof, and the one end side of the insertion portion 14 and the other end side of the fiber pass-through portion 18 are preferably opened to the respective length direction outer sides.

As illustrated in FIGS. 2-3, a transmission apparatus 20 and a reception apparatus 22 are preferably disposed inside the main body cover 12. A ceramic board 26 may be mounted on the transmission apparatus 20. The ceramic board 26 may be electrically connected to one face side of a first electrical board 24 (a side thereof that is closer to a cover outer face). An optical component 28, an electrical component 30 and the like may preferably be mounted on the ceramic board 26. The optical component 28 may be mounted on the one face side, and the electrical component 30 may be disposed close to the optical component 28. The optical component 28 and the electrical component 30 are preferably electrically connected by an unillustrated pattern. The optical component 28 provided at the transmission apparatus 20 is, for example, a surface-emitting semiconductor laser component (such as a VCSEL) with a plural number of light emission points arrayed in a row, each of which emits laser light in a direction orthogonal to a surface of the board.

A metal cover 32 is attached by unillustrated screws to the one face side of the ceramic board 26. The metal cover 32 is preferably fabricated of metal (for example, an aluminium alloy, stainless steel, copper or the like; a metal with high thermal conductivity is preferable), and formed in a rectangular plate shape.

As illustrated in FIG. 3, a recess portion 36 is preferably formed in the metal cover 32 to serve as a connection portion for connection of an optical connector 34. Additionally, a commonly used catch mechanism (a locking mechanism) may be employed at the connection portion such that the optical connector 34, which is inserted into the recess portion 36 of the metal cover 32, will not disengage from the recess portion 36.

As illustrated in FIG. 4, an optical part 40 is disposed at a laser light emission side of the optical component 28 of the ceramic board 26. The optical part 40 is preferably fixed by an adhesive to a floor portion side of the recess portion 36 of the metal cover 32. Thus, the recess portion 36 may also function as a support portion for the optical part 40. The optical part 40 optically focuses the laser lights emitted from the light points of the optical component 28 onto respective fiber end faces of the optical connector 34, preferably via microlenses and reflective surfaces (not illustrated) or the like.

An upper face of the electrical component 30 (an IC in the present example) touches against the metal cover 32, such that heat from the electrical component 30 is propagated into the metal cover 32. The electrical component 30 and the metal cover 32 may be caused to directly contact, or a widely known thermally conductive material may be interposed, such as a metal plate, a thermal conduction sheet, a heat-dissipating grease or the like. At the metal cover 32, an opposite end thereof from the end at which the recess portion 36 is formed serves as a heat propagation portion 32A, which is preferably formed with a small thickness.

Figure 3A:
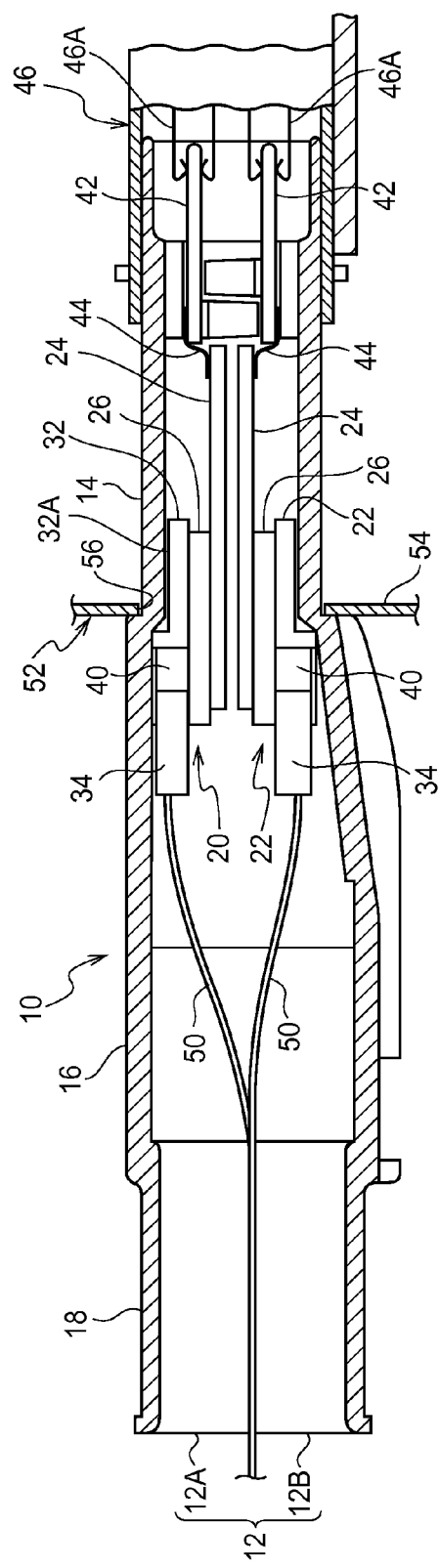
FIG. 3A is a vertical sectional diagram taken along an axial line of the connector of FIG. 1.

As illustrated in FIG. 3A, at least a portion of the heat propagation portion 32A of the metal cover 32—a portion that is at least a half thereof in the present example—is disposed in the insertion portion 14 of the main body cover 12. Via the heat propagation portion 32A of the metal cover 32, heat generated by the electrical component 30 is preferably propagated a minimum distance to the insertion portion 14 of the first cover member 12A. As long as the heat generated by the electrical component 30 is propagated to the insertion portion 14 of the first cover member 12A via the heat propagation portion 32A of the metal cover 32, a small gap (for example, 200 µm) may be opened between the heat propagation portion 32A and the first cover member 12A, or the heat propagation portion 32A and the first cover member 12A may be caused to directly contact, or a widely known thermally conductive material may be interposed, such as a metal plate, a thermal conduction sheet, a heat-dissipating grease or the like.

As illustrated in FIG. 2 to FIG. 3, a second electrical board 42 is disposed at the insertion portion side of the first electrical board 24. The first electrical board 24 and the second electrical board 42 are electrically connected by a flexible board 44.

Terminals 48 are provided at an end portion at the opposite side of the second electrical board 42 from the side at which the flexible board 44 is disposed. The terminals 48 preferably make contact with terminals 46A of a socket 46, described below. The terminals 48 are preferably electrically connected with the electrical component 30 via an unillustrated pattern.

As illustrated in FIG. 4, at the middle portion 16 of the main body cover 12, a surface of the optical part 40 that opposes the first cover member 12A is set lower than a surface of the metal cover 32; that is, a surface thereof that opposes the first cover member 12A, and the optical part 40 is separate (for example, by 400 µm) from the inner face of the first cover member 12A.

Therefore, the first cover member 12A is preferably prevented from contacting the optical part 40, and the shifting of the optical part 40 due to the first cover member 12A touching thereagainst may be prevented. The optical connector 34 may also be separated from the inner face of the first cover member 12A.

As illustrated in FIG. 3A, the reception apparatus 22, with substantially the same form as the transmission apparatus 20, is symmetrically disposed inside the main body cover 12 at the opposite side thereof from the transmission apparatus 20. The principal differences between the reception apparatus 22 and the transmission apparatus 20 are that the optical component 28 of the reception apparatus 22 preferably consists of photodiodes that receive laser lights and the electrical component 30 of the reception apparatus 22 is preferably the photodiodes, which receive the laser lights and convert the same to electrical signals. At the reception apparatus 22 too, a portion that is at least half of the heat propagation portion 32A of the metal cover 32 of the reception apparatus 22 is disposed at the insertion portion 14 of the main body cover 12, and heat generated by the electrical component 30 is propagated to the insertion portion 14 of the second cover member 12B via the heat propagation portion 32A of the metal cover 32.

Next, operation of the module-incorporating connector 10 is described.

Firstly, at the transmission apparatus 20 of the module-incorporating connector 10, the optical connector 34 for transmission, to which an optical fiber 50 for transmission is connected, is inserted into the recess portion 36 of the metal cover 32. The optical fiber 50 leads out to outside the module-incorporating connector 10 through the fiber pass-through portion 18. The reception apparatus 22 is connected and fixed in the same way as the transmission apparatus 20.

The transmission apparatus 20 and the reception apparatus 22 are preferably disposed inside the main body cover 12. Subsequently, as illustrated in FIG. 3, the module-incorporating connector 10 is connected to the socket 46, which is preferably disposed inside a device 52, via an insertion aperture 56 formed in an exterior case (casing body) 54 of the device. Accordingly, the terminals 48 of the module-incorporating connector 10 come into contact with the terminals 46A of the socket 46, and the transmission apparatus 20 and the reception apparatus 22 are electrically connected to the device.

When the module-incorporating connector 10 is connected to the socket 46 of the device 52, a portion that is almost the whole of the insertion portion 14 is disposed at the inner side of the exterior case 54. The device 52 circulates cooling air through the device interior with an air conditioner, and controls the internal temperature of the device 52 to within a pre-specified temperature range.

Therefore, when the device 52 operates and the electrical components 30 heat up due to transmission and reception of signals and the like, heat from the electrical components 30 is preferably propagated to the insertion portion 14 of the main body cover 12 by the metal covers 32 and is dissipated from the surfaces of the insertion portion 14. Thus, the electrical components 30 may be reliably and efficiently cooled by the cooling air circulating inside the exterior case coming into contact with the insertion portion 14.

Situations in which the temperature of an environment in which the device 52 is disposed (a temperature outside the device) is higher than the internal temperature of the device 52 are anticipated. However, because the internal temperature of the device 52 is controlled to within the pre-specified temperature range, the cooling of the electrical component 30 is unlikely to be affected by the environmental temperature, and the cooling of the electrical components 30 may be reliably implemented.

The heat of the electrical component 30 is also propagated to the middle portion 16 and the fiber pass-through portion 18 of the main body cover 12. Thus, a portion of the heat of the electrical components 30 is dissipated into the atmosphere outside the exterior case 54.

The transmission apparatus 20 and the reception apparatus 22 are provided as mutually separate bodies inside the module-incorporating connector 10. However, a structure in which only one or the other is provided is possible, or a transmission/reception apparatus that is provided with a laser component and photodiodes on a single board (an apparatus in which the transmission apparatus and the reception apparatus are made integral) may be disposed inside the module-incorporating connector 10.

The main body cover 12 of the module-incorporating connector 10 and the metal covers 32 are preferably fabricated of metal. However, as long as heat propagation is favorable, they may be formed from materials other than metals, such as ceramics, synthetic resins and the like.

In the above exemplary embodiment, the heat propagation portion 32A is formed in a rectangular flat plate shape. However, as long as heat propagation to the main body cover 12 is favorable, the shape may be a shape other than a rectangular flat plate.

In the Present Disclosure, the electrical component 30 is an IC. However, the electrical component 30 may be a component other than an IC that generates heat.

Obviously, it is preferable to set the metal cover 32 as close as possible to the insertion portion 14 in order to raise cooling efficiency. In the Present Disclosure, the electrical component 30 is not disposed in the insertion portion 14 of the main body cover 12. However, the electrical component 30 may be disposed in the insertion portion 14 of the main body cover 12 if there is room for the electrical component 30 to be disposed in the insertion portion 14. Further, the optical component 28 of the transmission apparatus 20 is a surface-emitting semiconductor laser component (a VCSEL) with a plural number of light emission points, but may be other types of laser component.

While a preferred embodiment of the Present Disclosure is shown and described, it is envisioned that those skilled in the art may devise various modifications without departing from the spirit and scope of the foregoing Description and the appended Claims.

What is claimed is:

1. A connector incorporating a module, comprising:
   a connector main body case including a first portion, that, when the connector main body case is connected to a socket provided at an inner side of an exterior case of a device, penetrates to the inner side of the exterior case, and a second portion that is disposed at an outer side of the exterior case;
   a module disposed inside the connector main body case and provided with an optical component that implements communication of optical signals, an electrical component connected with the optical component, and a second electrical terminal connected with the electrical component and connectable with a first electrical terminal provided at the socket; and
   a heat propagation means of which at least a portion is disposed at the first portion, the heat propagation means propagating heat generated by the electrical component to the first portion of the connector main body case.

2. The connector of claim 1, wherein the heat propagation means is integrally provided with a connection portion, to which an optical connector provided at an end portion of an optical fiber is connected.

3. The connector of claim 2, wherein the heat propagation means is further integrally provided with a support portion, which supports an optical part that implements communication of light between the optical fiber and the optical component.

4. The connector of claim 3, wherein a minimum gap between an inner face of the connector main body case and the optical part is set to be larger than a minimum gap between the inner face of the connector main body case and the heat propagation means.

5. The connector of claim 1, wherein the heat propagation means and the connector main body case are formed with metal material.

6. The connector of claim 5, wherein the heat propagation means is integrally provided with a connection portion, to which an optical connector provided at an end portion of an optical fiber is connected.

7. The connector of claim 6, wherein the heat propagation means is further integrally provided with a support portion, which supports an optical part that implements communication of light between the optical fiber and the optical component.

8. The connector of claim 7, wherein a minimum gap between an inner face of the connector main body case and the optical part is set to be larger than a minimum gap between the inner face of the connector main body case and the heat propagation means.

9. The connector of claim 5, wherein the second electrical terminal is disposed at the first portion, and the electrical component and the optical component are disposed at the second portion.

10. The connector of claim 9, wherein the heat propagation means is integrally provided with a connection portion, to which an optical connector provided at an end portion of an optical fiber is connected.

11. The connector of claim 10, wherein the heat propagation means is further integrally provided with a support portion, which supports an optical part that implements communication of light between the optical fiber and the optical component.

12. The connector of claim 11, wherein a minimum gap between an inner face of the connector main body case and the optical part is set to be larger than a minimum gap between the inner face of the connector main body case and the heat propagation means.

13. The connector of claim 1, wherein the second electrical terminal is disposed at the first portion, and the electrical component and the optical component are disposed at the second portion.

14. The connector of claim 13, wherein the heat propagation means is integrally provided with a connection portion, to which an optical connector provided at an end portion of an optical fiber is connected.

15. The connector of claim 14, wherein the heat propagation means is further integrally provided with a support portion, which supports an optical part that implements communication of light between the optical fiber and the optical component.

16. The connector of claim 15, wherein a minimum gap between an inner face of the connector main body case and the optical part is set to be larger than a minimum gap between the inner face of the connector main body case and the heat propagation means.

* * * * *